Feb. 18, 1930.  J. M. STRAND  1,747,192
MOLD FOR STONEWARE JARS AND THE LIKE
Filed Oct. 15, 1928   2 Sheets-Sheet 1
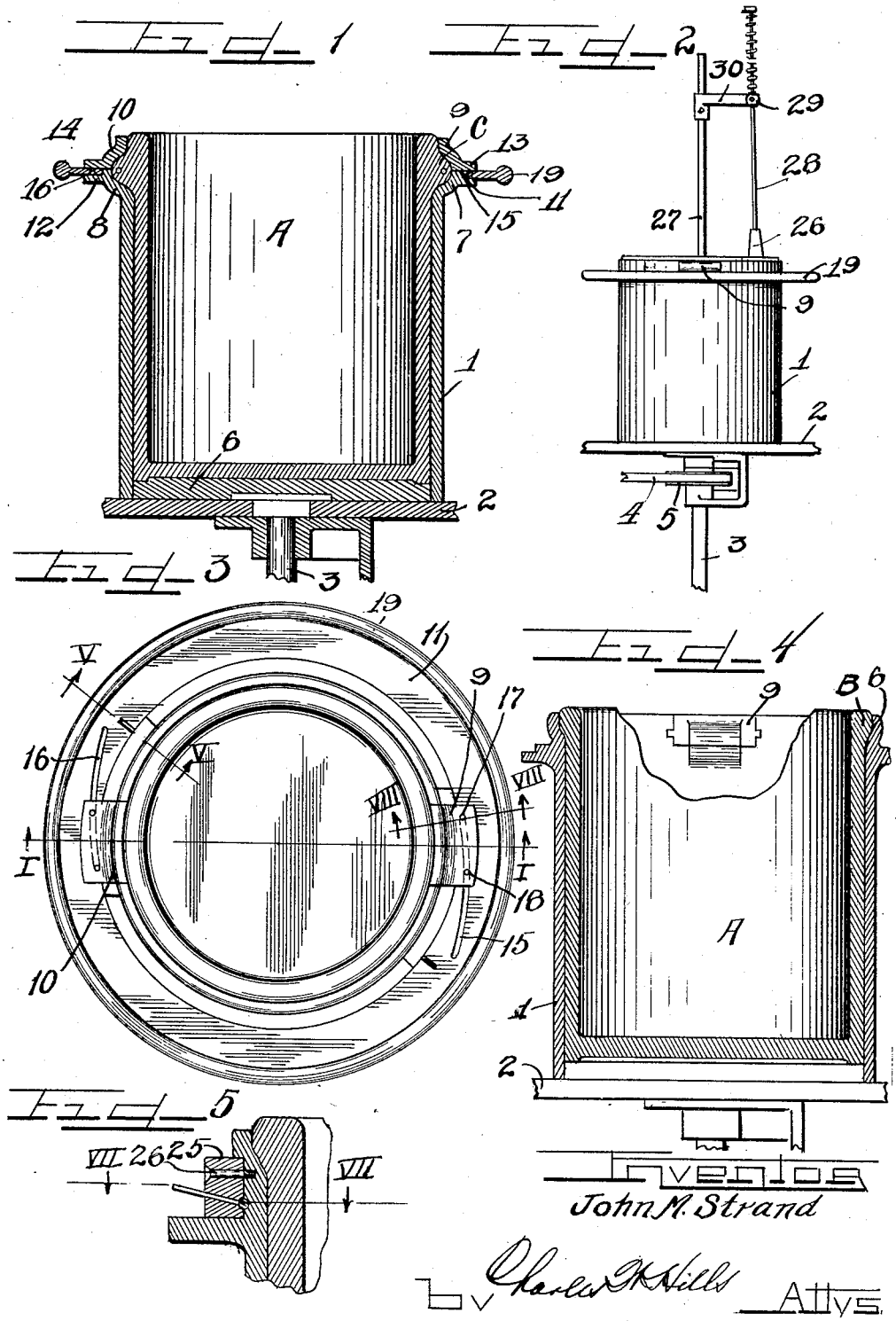
Inventor
John M. Strand
by Charles K. Hills
Attys.

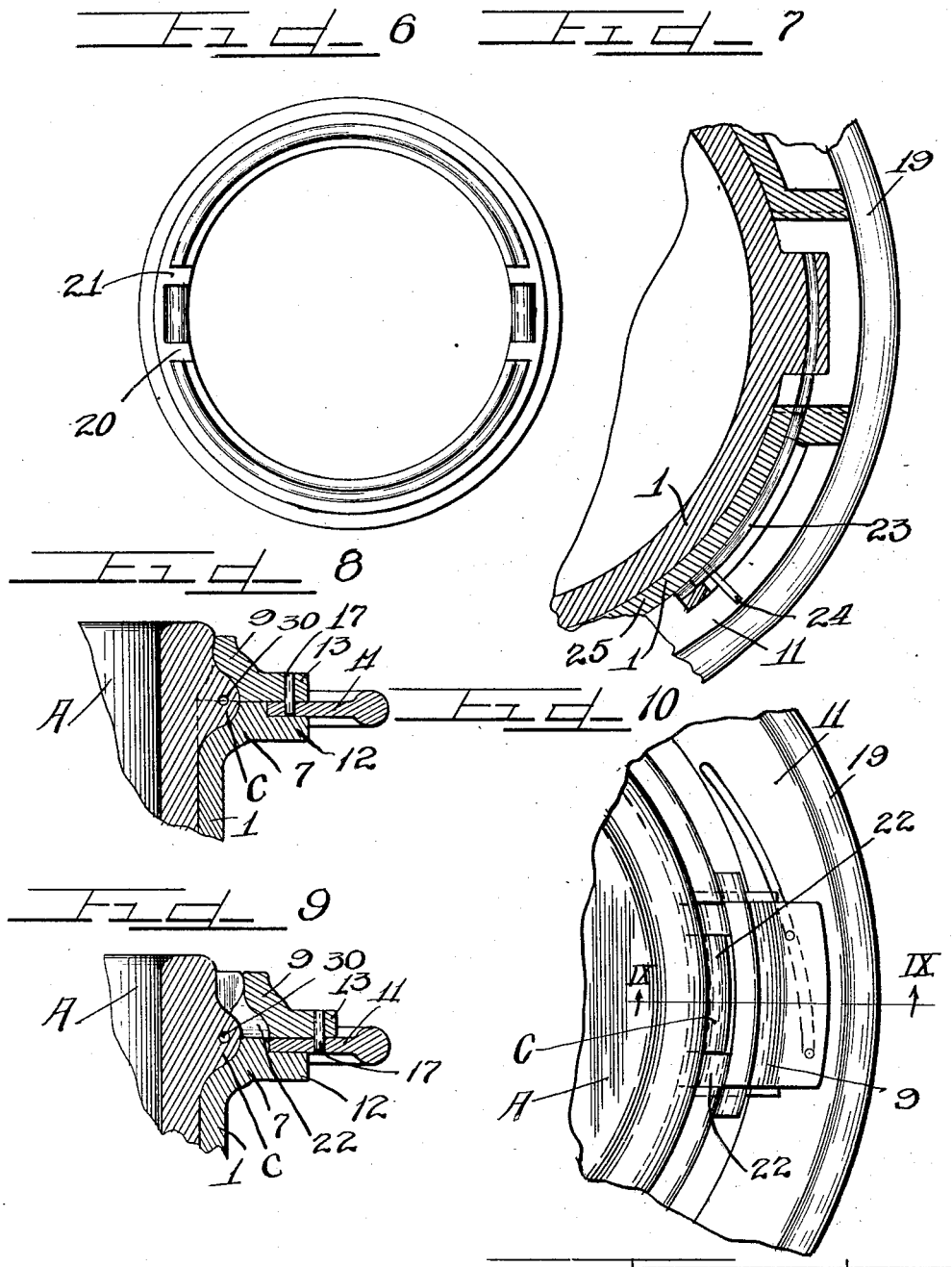

Patented Feb. 18, 1930

1,747,192

UNITED STATES PATENT OFFICE

JOHN M. STRAND, OF MONMOUTH, ILLINOIS, ASSIGNOR TO WESTERN STONEWARE CO., OF MONMOUTH, ILLINOIS, A CORPORATION OF MAINE

MOLD FOR STONEWARE JARS AND THE LIKE

Application filed October 15, 1928. Serial No. 312,439.

The term "mold" is used herein generally and includes molds, dies or any structure or device suitable for forming stoneware articles or the like, and is therefore to be construed accordingly.

This invention relates to a mold for stoneware jars and the like, and has particular reference to a mold for forming projections on such articles of stoneware which projections extend beyond the plan area of the bead of such articles.

An object of the invention is to provide a mold for forming projections beyond the plan area of the beads of stoneware jars and the like whereby such projections are formed at the time the jar is molded.

Another object of the invention is to provide a mold for forming projections on stoneware jars, crocks and the like which projections extend beyond the plan area of the bead and which allow ready removal of the finished article from the mold without removing any of the mold parts.

A further object of the invention is to provide a mold for stoneware jars, crocks and the like for forming molded lifting projections on such jars which projections are formed at the same time and by the same mold that the article is molded.

A still further object of the invention is to provide a mold for molding lifting projections on stoneware jars and the like which projections are strong and which are molded with the jar.

A still further object of the invention is to provide a mold for forming lifting projections on stoneware jars and the like which projections extend beyond the plan area of the beads of the jars and which mold has no removable parts and which is efficient and rapid in use.

The above, other and further objects of the invention will be apparent from the following description, accompanying drawings and appended claims.

One form of the invention is illustrated in the accompanying drawings and the views thereof are as follows:

Figure 1 is a vertical section through a spinning mold for stoneware showing a finished jar in said mold, which mold embodies the invention.

Figure 2 is an elevational view of a mold provided with an embodiment of the invention.

Figure 3 is a top plan view of the arrangement of Figure 1.

Figure 4 is a vertical section through a mold showing a finished jar therein with a portion of the jar broken away to show such details of construction of the mold.

Figure 5 is a section taken on line V—V of Figure 3.

Figure 6 is a top plan view of the mold with the projection forming portion removed.

Figure 7 is an enlarged fragmental partial sectional view of a piercing pin.

Figure 8 is a fragmental vertical sectional view through a portion of the mold and a finished jar showing the projection forming slide in operative or closed position.

Figure 9 is a view similar to Figure 8 showing the slide in outward or withdrawn position.

Figure 10 is a fragmental plan view of a slide in withdrawn or outward position.

The mold chosen to illustrate this invention is one designed to make an open mouth jar or crock having straight vertical sides.

The mold 1 having a cylindrical interior is arranged on a rotating table 2 which is rotated by means of a shaft 3 driven by a belt 4 passing over a pulley 5 on the shaft 3 and driven by any suitable source of power.

A removable bottom 6 is arranged within the mold 1 and rests on the table 2. The bottom 6 is arranged to be raised for the purpose of ejecting the finished jar A from the mold when said jar has been fully formed.

The upper portion of the mold 1 is provided with a recess 6 for forming the bead B outwardly of the upper end of the jar A. The mold 1 is provided at opposite points with depressions 7 and 8, there being two such depressions shown in the drawings arranged at diametrically opposite points, to receive some of the plastic material of which the jar A is formed to provide outwardly extending projections C on the jar below the bead B. The projections C are shown as formed integrally with the bead B but may if desired be arranged a slight distance below the bead.

Slides 9 and 10 are arranged in the mold 1 so as to move inwardly and outwardly with respect to the jar A as will be more fully explained.

The slides 9 and 10 have undercut under surfaces for cooperating with the depressions 7 and 8 to form therewith the finished projections C. The cross sectional shape of the projections C as well as the peripheral length of the same may be made as desired to form projections for receiving the bail of lifting handles. It is also within the contemplation of this invention to fashion the projections C as finger holds if desired. In such event then of course the depressions 7 and 8 and the slides 9 and 10 would be shaped to provide finger holds of proper size and extent.

A horizontally disposed ring 11 is supported about the open end of the mold A by extensions 12 formed as part of the depressions 7 and 8. The extensions 12 may of course extend about the mold 1 as desired. The ring 11 is arranged to oscillate in its supports and to move the slides 9 and 10 inwardly and outwardly.

Each of the slides 9 and 10 has a flat rear portion 13 and 14 respectively, which portions overlie the ring 11. The ring is provided with two slots 15 and 16 into which project pins 17 and 18 on the bottom of each extension 13 and 14 of the slides 9 and 10. The slots 15 and 16 are so curved as to move the slides 9 and 10 inwardly to full line position shown in Figures 1, 3, and 8 and also move the slides outwardly as shown in Figures 9 and 10 of the drawings. The outer margin of the ring 11 has a bead 19 formed thereon for ease in manipulation of the ring.

The upper end of the mold 1 is provided with outwardly extending slots 20, 21 a pair being on each side of the mold for receiving the projecting ears 22 at the ends of the slides 9 and 10. The ears 22 serve as end walls for the molding cavity formed between the under side of the slides 9 and 10 and the depressions 7 and 8. The depressions 7 and 8 of course have similar end portions so that the finished projections molded by the depressions 7 and 8 and the cooperating slides 9 and 10 will be similar in shape and uniform in finish.

An arcutate piercing pin 23 is arranged at each side of the mold in position to pierce the projections formed by the depressions 7 and 8 and the cooperating slides 9 and 10. Figure 7 shows in horizontal section such a pin 23 curved to conform to the surface of the mold 1 and having an extending handle 24 wherewith to hold the pin 23. A block 25 is fastened to the mold 1 by screws 26. The block is recessed to receive the piercing pin 23 as the same is reciprocated by means of the handle 24. The handle 24 in Figure 5 is shown as inclined to the horizontal for the purpose of easily grasping the same to move the piercing pin. There is a pin for each of the projections C formed in the manner heretofore described.

The arrangement of the slides 9 and 10 and the slots 15 and 16 in the ring 11 is such that when the slides are moved to outward position as shown in Figures 9 and 10 of the drawings the inner edges of said slides will be outside the bead B formed on the jar A. This is to permit ready withdrawal of the jar from the mold 1 when the same has been fashioned.

The operation of the mold is as follows:

A ball of plastic material such as potters' clay or the like of sufficient size is placed within the mold 1 and then the shaft 3 is turned to spin the mold. The pivotal action will spread the ball of clay and cause it to travel up the inner surface of the mold walls. A hand roller 26 supported by a shaft 27 which shaft extends into the mold 1 is used by the operator to mold the inner surface of the jar A. The roller 26 is carried in the end of a spindle 28 which is supported at 29 in a bracket 30 attached to the shaft 27 in such position as to be turned about its axis and also move up and down and also swung about its connection 29 so that the operator may very readily move said roller 26 in any direction he desires in order to fashion the clay into the finished jar A. Continued spinning of the mold 1 and the manipulation of the roller 26 will eventually form a jar A such as that shown in section in the drawings. It will be observed that in so shaping the jar A that a portion of the plastic material enters the spaces between the depressions 7 and 8 in the mold and the slides 9 and 10 thereon so as to provide the projections C. When the jar A has been fully molded and shaped the spinning motion is stopped and then the ring 10 is moved in counter-clockwise direction as viewed in Figures 3 and 10 thus withdrawing the slides 9 and 10 from the operative positon shown in Figures 1 and 8 of the drawings. Such movement of the ring withdraws these slides 9 and 10 so that the same lie outwardly of the projections C formed on the outer surface of the jar A. The handles 24 of the piercing pins 23 are then grasped and the pins advanced to pierce the projections C forming holes 30 in such projections. The holes 30 are for the reception of the ends of bails for attaching handles to the jar A. After the holes have been pierced the bottom or kick-off plate 6 is moved upwardly as viewed in Figure 1 of the drawings thus removing the jar A from the mold 1.

It will be observed that by this invention it is possible to form the projections C at the time the jar is molded thus doing away with the present practice of having to make these projections separately and then sticking the same to the molded jar.

Figure 4 shows the interior of one of the depressions 7 and the inner elevation of the slide 9. It will be observed that the inner surface of the slide 9 is shaped to correspond to the shape of the depressions 7 so that the projections C formed by these parts will be uniform in character.

It will be observed that by this invention it is possible to mold the lifting projections at the time the mold is formed and without having to use any removable parts for the mold. The provision of the slides 9 and 10 and the operating ring 11 therefor make it possible to speedily mold these projections and at the same time withdraw the slides for ready discharge of the jar from the mold when finished. There is nothing to be lost or misplaced and nothing to wear out in service.

Should it be desired to make the projections of any shape other than that illustrated in the drawings then as before stated the depressions 7 and 8 and the cooperating slides 9 and 10 would be made to correspond to the desired projections. Were it desired to make finger holds on a jar with the mold of this invention then of course the piercing pins 23 would not be used as it would be unnecessary to pierce the finger holds.

This invention is directed to a mold for forming projections on stoneware articles such as jars and crocks or the like which projections extend beyond the plan area of the bead of the article or articles being molded. It sometimes happens that the shape of the articles being molded is such that the sides of the article are curved somewhat beyond the plan area of the bead. In such event then the slides 9 and 10 would be arranged to clear the widest part of the jar or crock below the projections formed by the slides and cooperating depressions in the mold.

While I have described more or less precisely the details of construction of my invention, yet I do not wish to be understood as limiting myself thereto, as I am aware that changes may be made in the arrangement and proportion of parts and that equivalents may be substituted, all without departing from the spirit and scope of my invention.

I claim as my invention:

1. A mold for stoneware jars and the like having a bead forming recess near its open end, and a pair of slides having undercut molding surfaces movable toward and away from said recess for forming mold cavities extending outwardly adjacent said recess.

2. A mold for stoneware jars and the like having a bead forming recess near its open end, and a pair of slides having undercut molding surfaces movable toward and away from said recess for forming mold cavities extending outwardly adjacent said recess, said slides when in outward position being clear of the plan area of the bead defined by said recess.

3. A spinning mold for stoneware jars having a bead forming recess near its upper end, said mold having at opposite points depressions extending below and outwardly of the bead recess, slides on said mold having undercut under surfaces arranged over said depressions and forming therewith mold cavities extending outwardly of the bead recess, said slides being movable outwardly beyond the plan area of said recess, and means for moving said slides.

4. A mold for stoneware jars and the like having a bead forming recess near its open end, and a pair of slides having undercut molding surfaces movable toward and away from said recess for forming mold cavities extending outwardly adjacent said recess, and a ring in said mold connected to said slides to move said slides as said ring is turned.

5. A mold for stoneware jars and the like having a bead forming recess near its open end, said mold having portions extending outwardly beyond said recess to form projections on the articles fashioned by said mold, and axially movable arcuate pins carried by said mold and disposed to pierce the projections after the same have been molded by said portions.

6. A mold for stoneware articles having an open end, said mold being provided with a recess for forming a bead on the outside of the molded article, said mold having two oppositely arranged outwardly extending depressions below said recess, slides carried by said mold and movable over and away from said depressions, said slides having molding spaces therein for cooperating with said depressions to mold projections on said article extending beyond the bead formed by said recess, and a horizontally disposed ring on said mold having pin and slot connections with said slides for moving the same into and out of molding position as said ring is turned.

7. A mold for stoneware articles having an open end, said mold being provided with a recess for forming a bead on the outside of the molded article, said mold having two oppositely arranged outwardly extending depressions below said recess, slides carried by said mold and movable over and away from said depressions, said slides having molding spaces therein for cooperating with said depressions to mold projections on said article extending beyond the bead formed by said recess, and a horizontally disposed ring on said mold having pin and slot connections with said slides for moving the same into and out of molding position as said ring is turned, and axially movable arcuate piercing pins slidably arranged on said mold adjacent said depressions for piercing the projections formed by said depressions and slides after said slides have been moved outwardly.

8. A mold for stoneware articles having an open end, said mold being provided with a recess for forming a bead on the outside of the molded article, said mold having two oppositely arranged outwardly extending depressions below said recess, slides carried by said mold and movable over and away from said depressions, said slides having molding spaces therein for cooperating with said depressions to mold projections on said article extending beyond the bead formed by said recess, and a horizontally disposed ring on said mold having pin and slot connections with said slides for moving the same into and out of molding position as said ring is turned, said slides being movable outwardly beyond the bead area formed by said recess.

9. A mold for stoneware articles having an open end, said mold being provided with a recess for forming a bead on the outside of the molded article, said mold having two oppositely arranged outwardly extending depressions below said recess, slides carried by said mold and movable over and away from said depressions, said slides having molding spaces therein for cooperating with said depressions to mold projections on said article extending beyond the bead formed by said recess, and a horizontally disposed ring on said mold having pin and slot connections with said slides for moving the same into and out of molding position as said ring is turned, and axially movable arcuate piercing pins slidably arranged on said mold adjacent said depressions for piercing the projections formed by said depressions and slides after said slides have been moved outwardly, said slides being movable outwardly beyond the bead area formed by said recess.

10. A spinning mold for stoneware jars having a bead forming recess near its upper end, said mold having at opposite points depressions extending below and outwardly of the bead recess, slides on said mold having undercut under surfaces arranged over said depressions and forming therewith mold cavities extending outwardly of the bead recess, said slides being movable outwardly beyond the plan area of said recess, and means for moving said slides, and a ring cooperatively associated with said slides to move the same into molding position when turned in one direction and to move the same outwardly when turned in the opposite direction.

11. A mold for stoneware jars having a bead forming recess near its open end, said mold having portions extending outwardly beyond said recess and arranged below the same, slides cooperating with said recess when in operative position to form projections on the molded article extending beyond the bead recess, and axially movable arcuate pins carried by said mold to pierce the projections so molded.

12. A mold for stonware jars and the like having a bead forming recess near its open end, and movable members having undercut molding surfaces moving toward and away from said recess for forming mold cavities extending outwardly adjacent said recess.

13. A mold for stoneware jars and the like having a bead forming recess near its open end, movable members having undercut molding surfaces movable toward and away from said recess for forming mold cavities extending outwardly adjacent said recess, said members when in one position being clear of the plan area of the bead defined by said recess.

14. A mold for stoneware jars and the like having a bead forming recess near its open end, movable members having undercut molding surfaces movable toward and away from said recess for forming mold cavities extending outwardly adjacent said recess, and means cooperating with said members for moving the same into and out of molding position.

In testimony whereof I have hereunto subscribed my name at Monmouth, Warren County, Illinois.

JOHN M. STRAND.